United States Patent [19]
Arlozynski

[11] Patent Number: 5,382,355
[45] Date of Patent: Jan. 17, 1995

[54] ENGINE COOLANT FILTER

[76] Inventor: Daniel A. Arlozynski, N169 W20342 Georgetown Dr. Apt. 4, Jackson, Wis. 53037

[21] Appl. No.: 177,524

[22] Filed: Jan. 4, 1994

[51] Int. Cl.⁶ .................... B01D 27/10; B01D 27/08; B01D 35/02; B01D 35/14
[52] U.S. Cl. ...................... 210/85; 210/90; 210/91; 210/95; 210/109; 210/130; 210/133; 210/186; 210/249; 210/167; 210/416.1; 210/444; 210/450; 165/119
[58] Field of Search ................... 210/90, 85, 91, 95, 210/167, 130, 133, 109, 184, 186, 249, 416.1, 444, 450, 167, 428; 165/119

[56] References Cited
U.S. PATENT DOCUMENTS

| | | |
|---|---|---|
| 2,244,574 | 6/1941 | Rogers . |
| 2,319,421 | 5/1943 | MacLaren . |
| 2,473,727 | 6/1949 | Robertson . |
| 2,544,269 | 3/1951 | Leclair . |
| 2,602,547 | 7/1952 | Floss . |
| 2,639,783 | 5/1953 | Kovacs . |
| 2,685,565 | 8/1954 | Jones . |
| 2,722,316 | 11/1955 | Goscilo . |
| 2,942,572 | 6/1960 | Pall . |
| 2,955,712 | 10/1960 | Gutkowski . |
| 3,040,894 | 6/1962 | Pall . |
| 3,080,972 | 3/1963 | Smith . |
| 3,283,098 | 11/1966 | Bair . |
| 3,312,345 | 4/1967 | Rosaen . |
| 3,349,914 | 10/1967 | Kudlaty . |
| 3,420,375 | 1/1969 | Kudlaty . |
| 3,442,384 | 5/1969 | Downey . |
| 3,460,805 | 8/1969 | Kudlaty . |
| 3,503,506 | 3/1970 | Kudlaty . |
| 3,840,119 | 10/1974 | Weirich . |
| 3,841,484 | 10/1974 | Domnick . |
| 3,950,248 | 4/1976 | Brown . |
| 4,051,031 | 9/1977 | Suzuki . |
| 4,053,410 | 10/1977 | Lorimer . |
| 4,142,973 | 3/1979 | Kachman . |
| 4,268,384 | 5/1981 | Rosaen . |
| 4,272,368 | 6/1981 | Foord . |
| 4,316,801 | 2/1982 | Cooper . |
| 4,322,290 | 3/1982 | Carl . |
| 4,372,848 | 2/1983 | Manders . |
| 4,883,083 | 11/1989 | Fisher . |
| 5,281,331 | 1/1994 | Golan . |

FOREIGN PATENT DOCUMENTS

| | | |
|---|---|---|
| 278171 | 7/1965 | Australia . |
| 908222 | 4/1946 | France . |
| 44-2926 | 2/1969 | Japan . |
| 55-79014 | 6/1980 | Japan . |
| 95070 | 1/1939 | Sweden . |
| 760907 | 11/1956 | United Kingdom . |
| 1299861 | 12/1972 | United Kingdom . |
| 492291 | 5/1967 | U.S.S.R. . |
| 583810 | 12/1977 | U.S.S.R. . |
| 591206 | 2/1978 | U.S.S.R. . |
| 629952 | 10/1978 | U.S.S.R. . |
| 688208 | 9/1979 | U.S.S.R. . |

Primary Examiner—Thomas M. Lithgow

[57] ABSTRACT

A new and improved engine coolant filter for removing particulate matter such as scale and rust from an internal combustion engine cooling system, the engine coolant filter comprising a filter element wherethrough coolant fluid may be circulated, the filter element including a housing having an input aperture and an output aperture, the housing also having filter medium disposed between the input aperture and the output aperture wherethrough coolant fluid may flow, and a manifold installed in series with a pressurized coolant line, the manifold having an input port and an output port, the manifold being removedly connected to the filter element such that coolant fluid flowing into the input port is circulated through the filter medium then out the output port, the manifold also having an automatic clogged-filter bypass valve whereby an unacceptable pressure differential across the ports caused by clogged filter medium shunts the coolant fluid around the clogged filter medium, the manifold further having a visual indicator, whereby a user is warned of a filter medium clog.

1 Claim, 4 Drawing Sheets

ENGINE COOLANT FILTER

BACKGROUND OF THE INVENTION

1. Field of the Invention

The present invention relates to engine cooling systems and more particularly pertains to engine coolant filters which may be adapted for removing particulate matter such as scale and rust from an internal combustion engine cooling system.

2. Description of the Prior Art

The use of engine coolant filters is known in the prior art. More specifically, engine coolant filters heretofore devised and utilized for the purpose of removing particulate matter such as scale and rust from an internal combustion engine cooling system are known to consist basically of familiar, expected and obvious structural configurations, notwithstanding the myriad of designs encompassed by the crowded prior art which have been developed for the fulfillment of countless objectives and requirements.

The present invention is directed to improving devices for removing particulate matter such as scale and rust from an internal combustion engine cooling system in a manner which is safe, secure, economical and aesthetically pleasing.

For example, U.S. Pat. No. 3,776,384 to Offer discloses a replaceable element coolant filter including a pleated paper filter element for use in an existing water filter housing for internal combustion engine cooling systems by means of a grommet that serves to seat the element and seal it around the housing outlet. The invention does not provide a way to automatically bypass a clogged filter element which may block the flow of coolant fluid causing damage to the system.

U.S. Pat. No. 3,682,308 to Moon shows an engine coolant filter comprising a filter base connected to a coolant conduit and a filter body which is detachable from the base for replacement; check valves are carried in the base filter inlet and outlet passageways so that the filter is replaced without coolant loss; a pressure differential is created across the filter assembly so that part of the coolant flowing through the conduit is forced through the filter. The disclosure does not show a way to indicate to the user when the filter is clogged; furthermore, the invention described is overly complex in its manner of connection to the cooling system which leads to high cost to add to existing systems.

U.S. Pat. No. 4,901,786 to Vataru et al. describes an engine coolant flush-filtering method using external gas pressure and radiator valving. The method of the invention described pertains to apparatus unsuitable for permanent installation on motor vehicle coolant systems.

The prior art also discloses a coolant filtering system as shown in U.S. Pat. No. 4,613,437 to Wiand which consists of a coolant filter assembly particularly adapted for filtering particulate matter from coolant fluid used with corrective elens grinding and edging machines.

U.S. Pat. No. 4,966,693 to Brandt et al illustrates an apparatus for processing coolant, particularly coolant used in metal-working machines. Neither of the inventions mentioned above can be adapted for use in pressurized internal combustion engine coolant systems; additionally, both of the inventions disclosed are relatively complicated having a high cost of manufacture.

In this respect, the engine coolant filter according to the present invention substantially departs from the conventional concepts and designs of the prior art, and in so doing provides an apparatus primarily developed for the purpose of removing particulate matter such as scale and rust from an internal combustion engine cooling system.

Therefore, it can be appreciated that there exists a continuing need for new and improved engine coolant filter which can be used for removing particulate matter such as scale and rust from an internal combustion engine cooling system. In this regard, the present invention substantially fulfills this need.

As illustrated by the background art, efforts are continuously being made in an attempt to develop devices for removing particulate matter such as scale and rust from an internal combustion engine cooling system. No prior effort, however, provides the benefits attendant with the present invention. Additionally, the prior patents and commercial techniques do not suggest the present inventive combination of component elements arranged and configured as disclosed and claimed herein.

The present invention achieves its intended purposes, objects, and advantages through a new, useful and unobvious combination of method steps and component elements, with the use of a minimum number of functioning parts, at a reasonable cost to manufacture, and by employing only readily available materials.

SUMMARY OF THE INVENTION

In view of the foregoing disadvantages inherent in the known types of engine coolant filters now present in the prior art, the present invention provides an improved engine coolant filter construction wherein the same can be utilized for removing particulate matter such as scale and rust from an internal combustion engine cooling system. As such, the general purpose of the present invention, which will be described subsequently in greater detail, is to provide a new and improved engine coolant filter apparatus and method which has all the advantages of the prior art engine coolant filters and none of the disadvantages.

The invention is defined by the appended claims with the specific embodiment shown in the attached drawings. For the purpose of summarizing the invention, the invention may be incorporated into a new and improved engine coolant filter for removing particulate matter such as scale and rust from an internal combustion engine cooling system. The engine coolant filter comprises a manifold having a first input port with fitting means thereon whereon a coolant fluid hose may be connected. The manifold also has an input chamber opening from the input port and an exit passage issuing from the input chamber. The manifold additionally has a sealing surface with a recess therein wherein a gasket may be received. The manifold further has a second input port with a threaded fitting thereon. The manifold moreover has an output chamber opening from the second input port, the output chamber having an output port issuing therefrom. The output port has fitting means thereon whereon a coolant hose may be connected. The manifold additionally has a bypass passage from the input chamber to the output chamber. The engine coolant filter additionally includes removable filter means wherethrough coolant fluid may pass whereby particulate matter is removed and retained. The filter means comprises a hollow filter body having an input aperture therein, the input aperture being adjacent to the exit passage of the manifold input chamber wherethrough coolant fluid may flow. The filter body also has an input chamber issuing from the input aperture. The filter body additionally has a sealing surface with gasket means fixedly connected thereto surrounding the input aperture. The gasket means cooperatively engages the recess in the manifold sealing surface such as to preclude leakage of coolant fluid. The filter body further has a central output chamber fixedly mounted therein, the output chamber having a threaded output aperture threadedly engaged with the threaded fitting of the manifold second input port whereby a liquid-tight seal is formed. The output chamber also has a wall with a plurality of equally spaced apart perforations therethrough wherethrough coolant fluid may flow from the input chamber into the output chamber. The engine coolant filter further includes a porous filter medium surrounding the outside of the output chamber such that coolant fluid is forced therethrough, and subsequently into the output chamber, by the normal internal pressure of the engine coolant system. The filter medium has characteristics such that fine solid particles will be trapped therein while coolant fluid is passed unimpeded. The engine coolant filter also includes pressure-relief means whereby excess pressure caused by clogged filter medium is automatically shunted around the filter means, through the bypass passage, directly to the output chamber. The pressure-relief means also has a visual annunciator whereby a user is warned of a clogged filter. The engine coolant filter, moreover, has bracket means whereby it may be secured inside an engine compartment or other appropriate place.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In as much as the foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present invention. It should be realized by those skilled in the art that such equivalent methods and structures do not depart from the spirit and scope of the invention as set forth in the appended claims.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Therefore, it is an object of the present invention to provide a new and improved engine coolant filter for removing particulate matter such as scale and rust from an internal combustion engine cooling system, the engine coolant filter comprising a filter element wherethrough coolant fluid may be circulated, the filter element including a housing having an input aperture and an output aperture, the housing also having filter medium disposed between the input aperture and the output aperture wherethrough coolant fluid may flow, and a manifold installed in series with a pressurized coolant line, the manifold having an input port and an output port, the manifold being removedly connected to the filter element such that coolant fluid flowing into the input port is circulated through the filter medium then out the output port, the manifold also having an automatic clogged-filter bypass valve whereby an unacceptable pressure differential across the ports caused by clogged filter medium shunts the coolant fluid around the clogged filter medium, the manifold further having a visual indicator whereby a user is warned of a filter medium clog.

It is another object of the present invention to provide a new and improved engine coolant filter which may be easily and efficiently manufactured and marketed.

It is a further object of the present invention to provide a new and improved engine coolant filter which is of a durable and reliable construction.

An even further object of the present invention is to provide a new and improved engine coolant filter which is susceptible of a low cost of manufacture with regard to both materials and labor, and which accordingly is then susceptible of low prices of sale to the consuming public, thereby making such engine coolant filters economically available to the buying public.

Still yet another object of the present invention is to provide a new and improved engine coolant filter which provides in the apparatuses and methods of the prior art some of the advantages thereof, while simultaneously overcoming some of the disadvantages normally associated therewith.

Still yet another object of the present invention is to provide a new and improved engine coolant filter which may be installed in existing as well as new systems.

Yet another object of the present invention is to provide a new and improved engine coolant filter which provides automatic bypass means to protect the coolant system from extreme internal pressure caused by a clogged filter.

Even still another object of the present invention is to provide a new and improved engine coolant filter having a means to bypass coolant fluid around a motor vehicle heater core during warm-weather thereby prolonging the life of the heater core.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention. The foregoing has outlined some of the more pertinent objects of this invention. These objects should be construed to be merely illustrative of some of the more prominent features and applications of the present invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
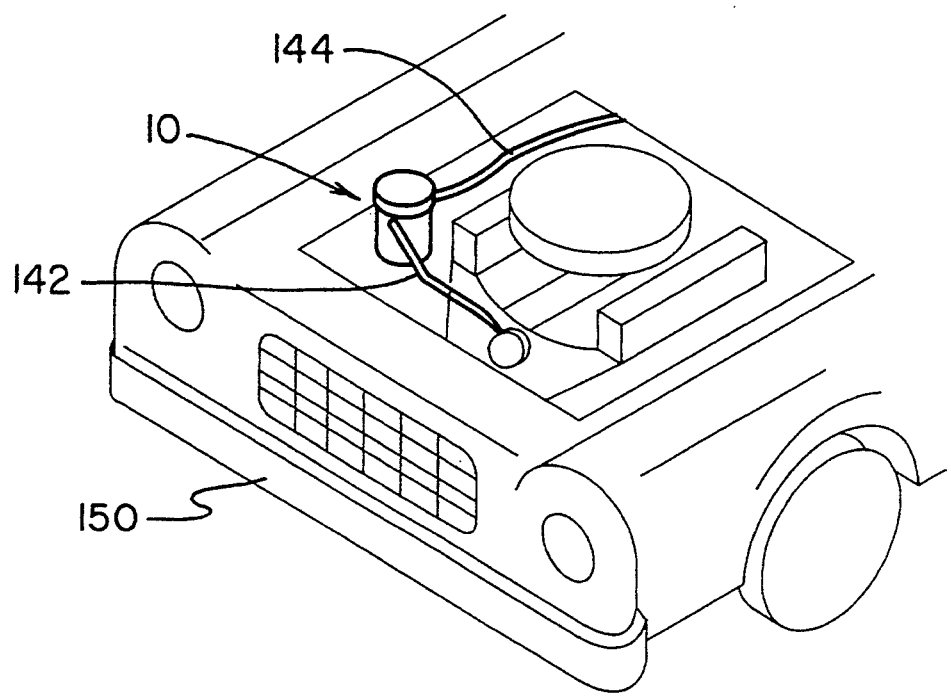
FIG. 1 is a perspective view of the present invention installed in a conventional motor vehicle.
Figure 2:
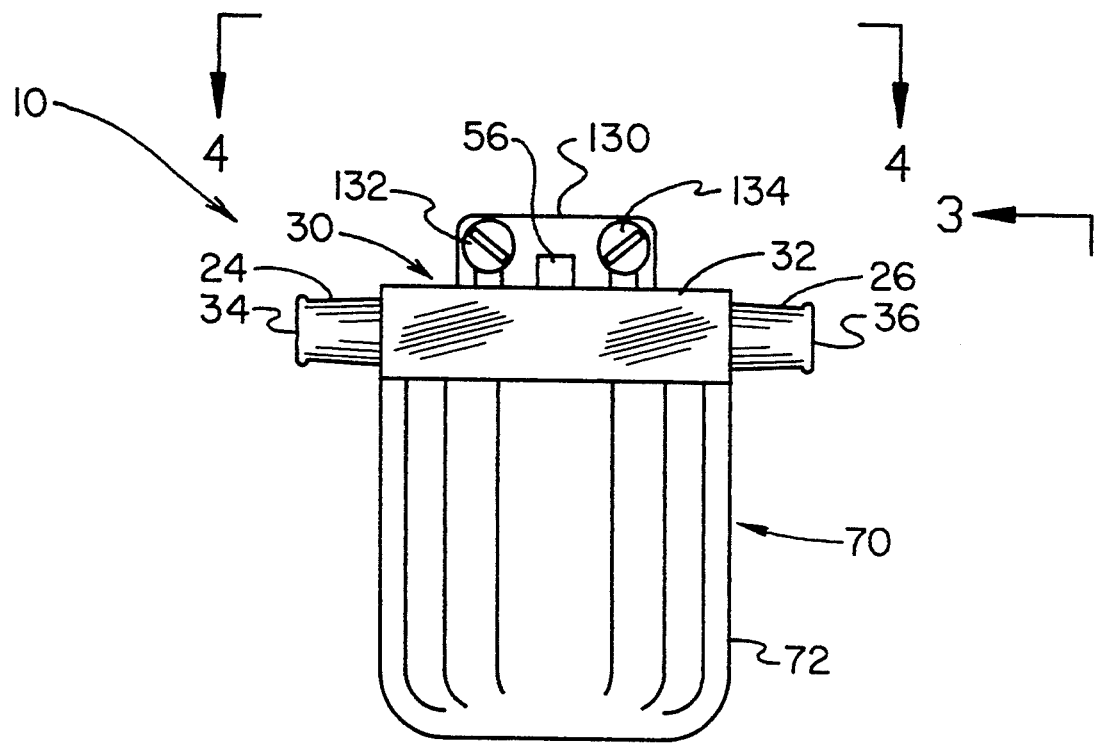
FIG. 2 is a front elevational view of the invention of FIG. 1.
Figure 3:
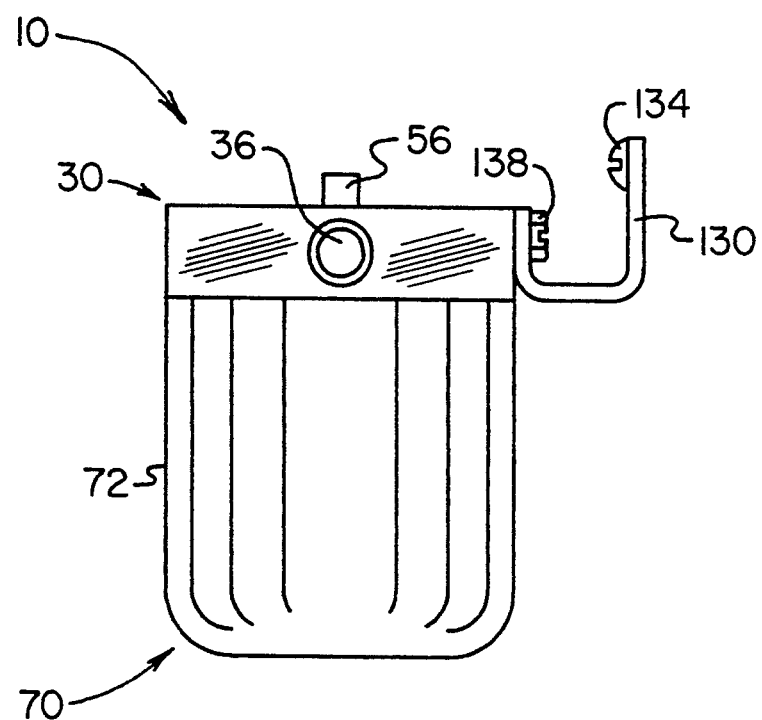
FIG. 3 is a side elevational view of the invention of FIG. 1.
Figure 4:
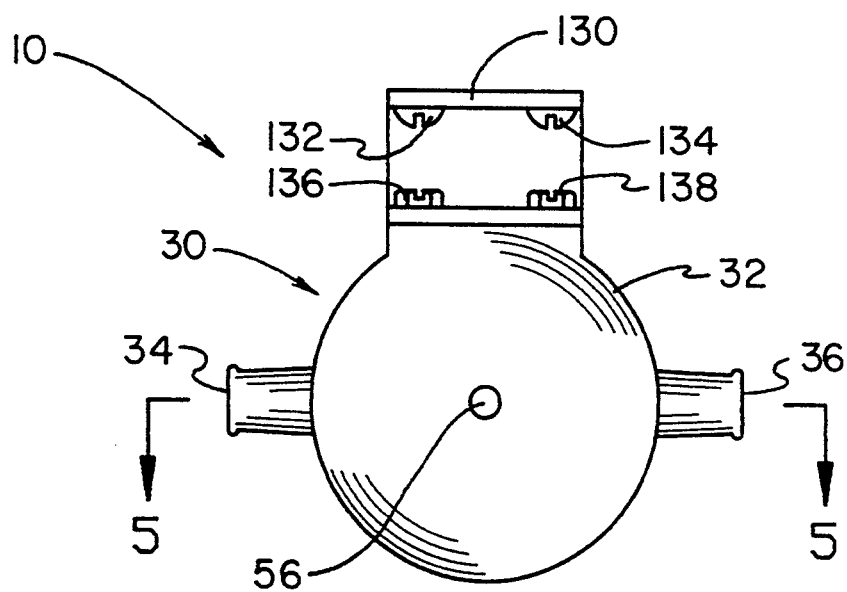
FIG. 4 is a top plan view of the invention of FIG. 1.
Figure 5:
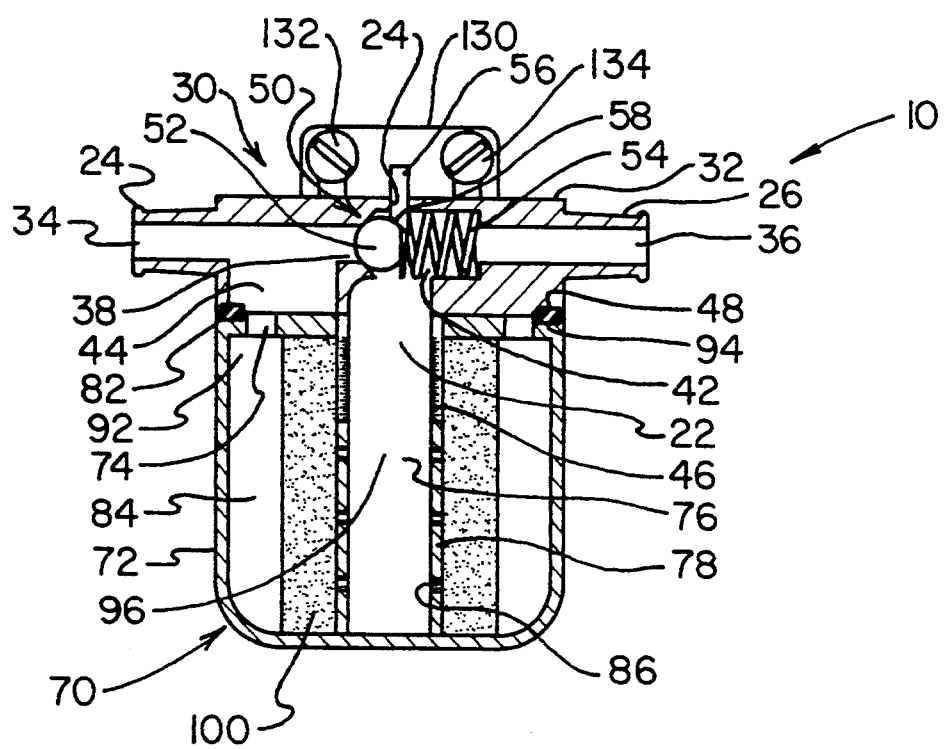
FIG. 5 is a sectional view of the invention of FIG. 4 taken along the line 5—5.

With reference now to the drawings, and in particular to FIG. 1 thereof, a new and improved engine coolant filter embodying the principles and concepts of the present invention and generally designated by the reference numeral 10 will be described.

From an overview standpoint, the engine coolant filter 10 is adapted for use with removing particulate matter such as scale and rust from an internal combustion engine cooling system. See FIG. 1.

With reference now to FIGS. 1 through 5, more specifically, it will be noted that an engine coolant filter 10, for removing particulate matter such as scale and rust from an internal combustion engine cooling system, is shown. The engine coolant filter 10 comprises a manifold 30 having a first input port 34 with fitting means 24 thereon whereon a coolant fluid hose 142 may be connected.

The manifold 30 also has an input chamber 44 opening from the input port 34 and an exit passage 74 issuing from the input chamber 44. The manifold 30 additionally has a recessed sealing surface 48 wherein a gasket 82 may be received. The manifold 30 further has a second input port 22 with a threaded fitting 46 thereon. The manifold 30 moreover has an output chamber 42 opening from the second input port 22, the output chamber 42 having an output port 36 issuing therefrom.

The output port 36 has fitting means 26 thereon whereon a coolant hose 144 may be connected. The manifold 30 additionally has a bypass passage 38 from the input chamber 44 to the output chamber 42. The engine coolant filter 10 additionally includes removable filter means 70 wherethrough coolant fluid may pass whereby particulate matter is removed and retained. The filter means 70 comprises a hollow filter body 72 having an input aperture 92 therein, the input aperture 92 being adjacent to the exit passage 74 of the manifold input chamber 44 wherethrough coolant fluid may flow.

The filter body 72 also has an input chamber 84 issuing from the input aperture 92. The filter body 72 additionally has a sealing surface 94 with gasket means 82 fixedly connected thereto surrounding the input aperture 92. The gasket means 82 cooperatively engages the recess sealing surface 48 in the manifold such as to preclude leakage of coolant fluid. The filter body 72 further has a central output chamber 76 fixedly mounted therein, the output chamber 76 having a threaded output aperture 96 threadedly engaged with the threaded fitting 46 of the manifold second input port 22 whereby a liquid-tight seal is formed. The output chamber 76 also has a wall 78 with a plurality of equally spaced apart perforations 86 therethrough wherethrough coolant fluid may flow from the input chamber 84 into the output chamber 76.

The engine coolant filter 10 further includes a porous filter medium 100 surrounding the outside of the output chamber wall 78 such that coolant fluid is forced therethrough, and subsequently into the output chamber 76, by the normal internal pressure of the engine coolant system. The filter medium 100 has characteristics such that fine solid particles will be trapped therein while coolant fluid is passed unimpeded.

The engine coolant filter 10 also includes pressure-relief means 50 whereby excess pressure caused by clogged filter medium 100 is automatically shunted around the filter means 70, through the bypass passage 38, directly to the output chamber 42. The pressure-relief means 50 comprises a biasing means 54, such as a compression coil spring, disposed within the manifold output chamber 42 in touching operative relationship with a control valve ball 52.

The control valve ball 52 is disposed within the output chamber 42 in biased blocking relationship against the inside end of the bypass passage 38 whereby the bypass passage 38 is held normally closed. An abnormal pressure created within the manifold input chamber 38 by restricted coolant fluid flow due to clogged filter medium 100 tends to overcome the biasing tension on the control valve ball 52 whereby opening the bypass passage 38 whereby coolant fluid is shunted directly to the manifold output chamber 42.

The pressure-relief means 50 also has a visual annunciator whereby a user is warned of a clogged filter. The visual annunciator consists of a brightly colored rod 56 within a hole 24 extending from the manifold output chamber 42 to a point external to the manifold 30. The colored rod 56 has a beveled end 58 in cooperative touching relationship with the control valve ball 52 such that opening of the control valve ball 52 caused by clogged filter medium 100 causes the colored rod 56 to project more from the manifold 32 whereby the user may be notified of a filter medium clog.

The engine coolant filter 10, moreover, has bracket means 130 whereby it may be secured inside an engine compartment or other appropriate place.

Figure 6:
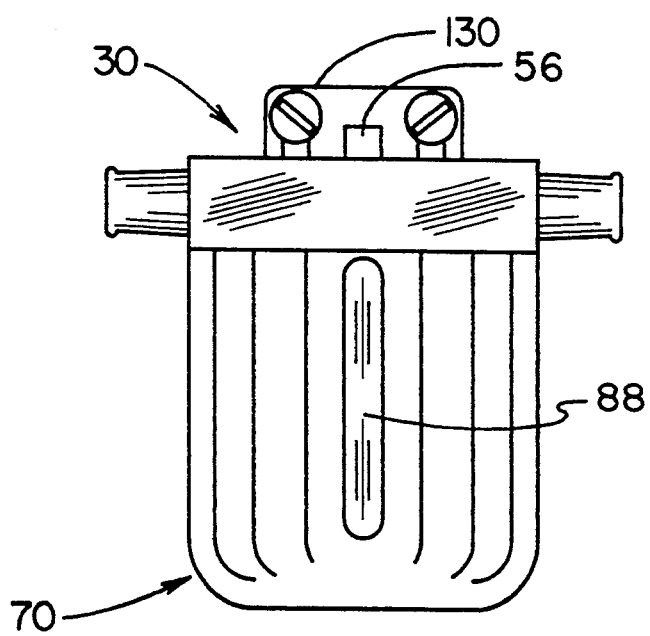
FIG. 6 is a front elevational view of a first modification of the invention of FIG. 1 showing the sight glass.

A first modification of the preferred embodiment of the engine coolant filter 10 is shown in FIG. 6 wherein the filter body 72 additionally includes sight-glass means 88 wherethrough the user may view the coolant fluid for visually gauging cleanliness, presence of additives, or the like.

Figure 7:
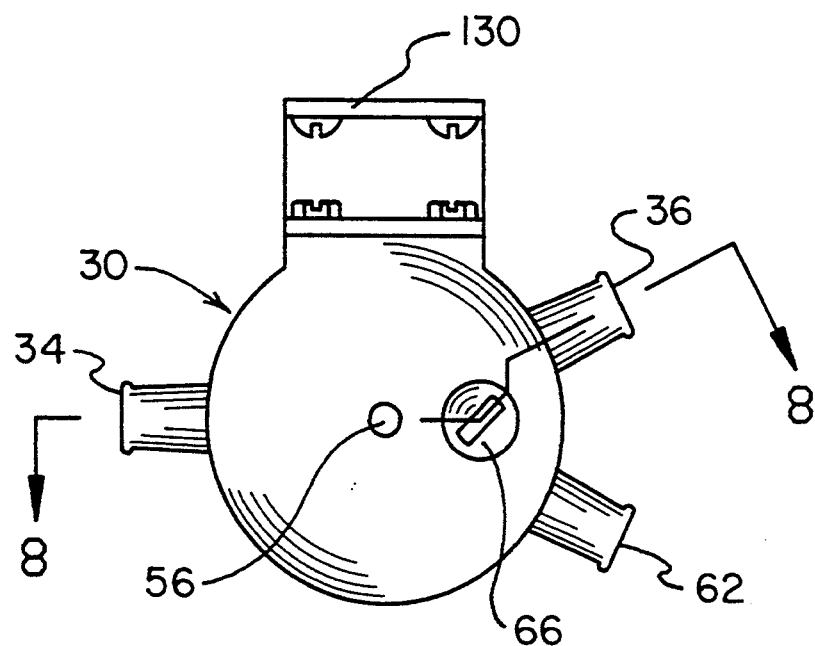
FIG. 7 is a top plan view of a second modification of the invention of FIG. 1 illustrating the second output port and valve position indicator.
Figure 8:
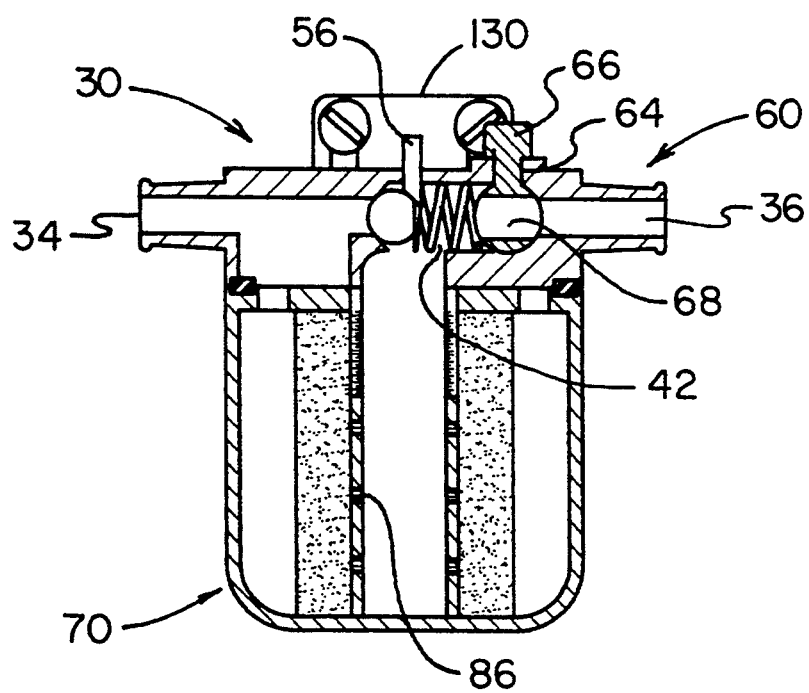
FIG. 8 is a sectional view of the invention of FIG. 8 taken along the line 8—8.

FIGS. 7 and 8 show a second modification of the engine coolant filter 10 which further includes a manual warm-weather heater core bypass means 60. The heater bypass means 60 comprises a second output port 62 issuing from the output chamber 42 and a manually operated valve 68 within the output chamber 42 wherethrough coolant fluid may be directed to either the first output 36 port or the second output port 62 whereby the coolant fluid will either flow through the heater core (not shown) or will be shunted around the heater core. The heater bypass means 60 additionally includes indicator means 66 whereby a user will have a visual indication of the valve position.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention. In as much as the present disclosure includes that contained in the appended claims as well as that of the foregoing description. Although this invention has been described in its preferred forms with a certain degree of particularity, it is understood that the present disclosure of the preferred form has been made only by way of example and numerous changes in the details of construction and combination and arrangement of parts may be resorted to without departing from the spirit and scope of the invention.

Now that the invention has been described,
What is claimed is:

1. An engine coolant filter apparatus for removing particulate matter such as scale and rust, the engine coolant filter apparatus comprising in combination:

a cooling system including an engine, a heater core, and a radiator in fluid communication with both said engine and said heater core;

a manifold having a first input port with first fitting means for connecting a first coolant fluid hose to said first input port, the manifold also having an input chamber opening from the input port, the input chamber having an exit passage issuing therefrom, the manifold additionally having a sealing surface with a recess therein wherein a gasket may be received, the manifold further having a second input port with a threaded fitting thereon, the manifold moreover having an output chamber opening from the second input port, the output chamber having an output port issuing therefrom, the output port having second fitting means for connecting a second coolant fluid hose to said output port, the manifold additionally having a bypass passage from the input chamber to the output chamber;

removable filter means wherethrough coolant fluid may pass whereby particulate matter is removed and retained, the filter means comprising:

a hollow filter body having an input aperture therein, the input aperture being adjacent to the exit passage of the manifold input chamber wherethrough coolant fluid may flow, the filter body also having an input chamber issuing from the input aperture, the filter body additionally having a sealing surface with gasket means fixedly connected thereto surrounding the input aperture, the gasket means cooperatively engaging the recess in the manifold sealing surface such as to preclude leakage of coolant fluid, the filter body further having a central output chamber fixedly mounted therein, the output chamber having a threaded output aperture threadedly engaged with the threaded fitting of the manifold second input port whereby a liquid-tight seal is formed, the output chamber also having a wall with a plurality of equally spaced apart perforations therethrough wherethrough coolant fluid may flow from the input chamber into the output chamber;

a porous filter medium surrounding the outside of the output chamber such that coolant fluid is forced therethrough and subsequently into the output chamber by the normal internal pressure of the engine coolant system, the filter medium having characteristics such that fine solid particles will be trapped therein while coolant fluid is passed unimpeded;

pressure-relief means for automatically shunting the coolant around the filter means through the bypass passage directly to the output chamber when excess pressure is caused by filter clogging, the pressure-relief means also having a visual annunciator means for warning a user of a clogged filter;

bracket means connected to said manifold whereby the engine coolant filter can be secured inside an engine compartment of a vehicle; and, a manual warm-weather heater core bypass means for selectively directing the coolant flow through said heater core, the heater bypass means comprising a second output port issuing from the output chamber; a manually operated valve within the output chamber wherethrough coolant fluid can be directed to either the first output port or the second output port whereby the coolant fluid will either flow through the heater core or will be shunted around the heater core; and indicator means whereby a user will have a visual indication of the valve position.

* * * * *